United States Patent [19]

Szabo

[11] Patent Number: 5,152,555
[45] Date of Patent: Oct. 6, 1992

[54] QUICK CONNECT INSERTION INDICATOR CLIP
[75] Inventor: George Szabo, Ortonville, Mich.
[73] Assignee: ITT Corporation, New York, N.Y.
[21] Appl. No.: 675,374
[22] Filed: Mar. 26, 1991
[51] Int. Cl.⁵ .............................................. F16L 35/00
[52] U.S. Cl. ................................ 285/93; 285/305; 285/319; 285/921
[58] Field of Search .................. 285/93, 305, 319, 921

[56] References Cited

U.S. PATENT DOCUMENTS

| 2,021,241 | 11/1975 | Mall | 235/305 X |
|---|---|---|---|
| 3,698,742 | 10/1972 | Jones et al. | 285/93 X |
| 4,244,608 | 1/1981 | Stuemky | 285/305 |
| 4,423,892 | 1/1984 | Bartholomew | 285/319 |
| 4,697,832 | 10/1987 | Dickirson . | |
| 4,707,000 | 11/1987 | Torgardh . | |
| 4,712,810 | 12/1987 | Pozzi . | |
| 4,725,081 | 2/1988 | Bauer . | |
| 4,730,856 | 3/1988 | Washizu . | |
| 4,743,051 | 5/1988 | Proni . | |
| 4,756,558 | 7/1988 | Beamer . | |
| 4,772,052 | 9/1988 | Morain . | |
| 4,781,400 | 11/1988 | Cunningham . | |
| 4,782,101 | 11/1988 | Peterson . | |
| 4,793,637 | 12/1988 | Laipply . | |
| 4,793,639 | 12/1988 | Glover . | |
| 4,802,697 | 2/1989 | Bartholomew . | |
| 4,867,487 | 9/1989 | Phillis . | |
| 4,895,395 | 1/1990 | Ceriani . | |
| 4,895,396 | 0/1990 | Washizu . | |
| 4,913,467 | 4/1990 | Washizu . | |
| 4,915,420 | 4/1990 | Washizu . | |
| 4,919,457 | 4/1990 | Moretti . | |
| 4,923,220 | 5/1990 | Guest . | |
| 4,923,228 | 5/1990 | Laipply . | |
| 4,925,217 | 5/1990 | Ketcham . | |
| 4,927,185 | 5/1990 | McNaughton . | |
| 4,929,002 | 5/1990 | Sauer . | |
| 4,938,510 | 7/1990 | Gmeiner . | |
| 4,946,205 | 8/1990 | Washizu . | |

FOREIGN PATENT DOCUMENTS

| 1148191 | 10/1989 | Japan . | |
|---|---|---|---|
| 2216213 | 10/1989 | United Kingdom | 285/93 |

Primary Examiner—Michael F. Trettel
Attorney, Agent, or Firm—Robert P. Seitter; J. Gordon Lewis

[57] ABSTRACT

An indicator device employed for visual and/or tactile inspection of a quick connector to confirm coupling of the male and female elements thereof includes a flag portion positioned externally of said coupling and members extending from the flag portion to embrace the female element. Engagement tabs extend from the members through registering apertures in the female element for contact with an abutment surface formed by the male element upon coupling of said quick connector to enable removal of said indicator device as verification of coupling.

11 Claims, 3 Drawing Sheets

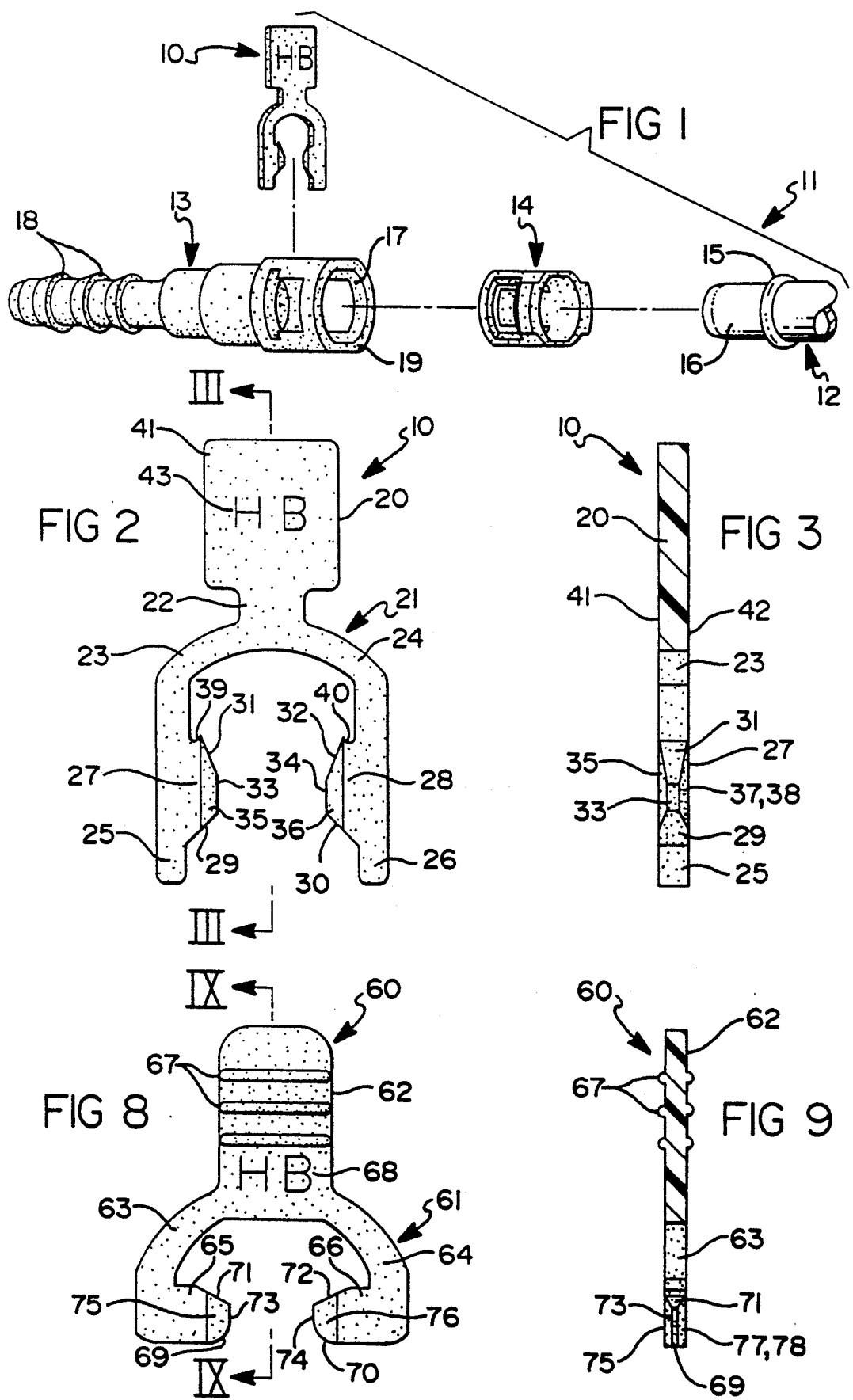

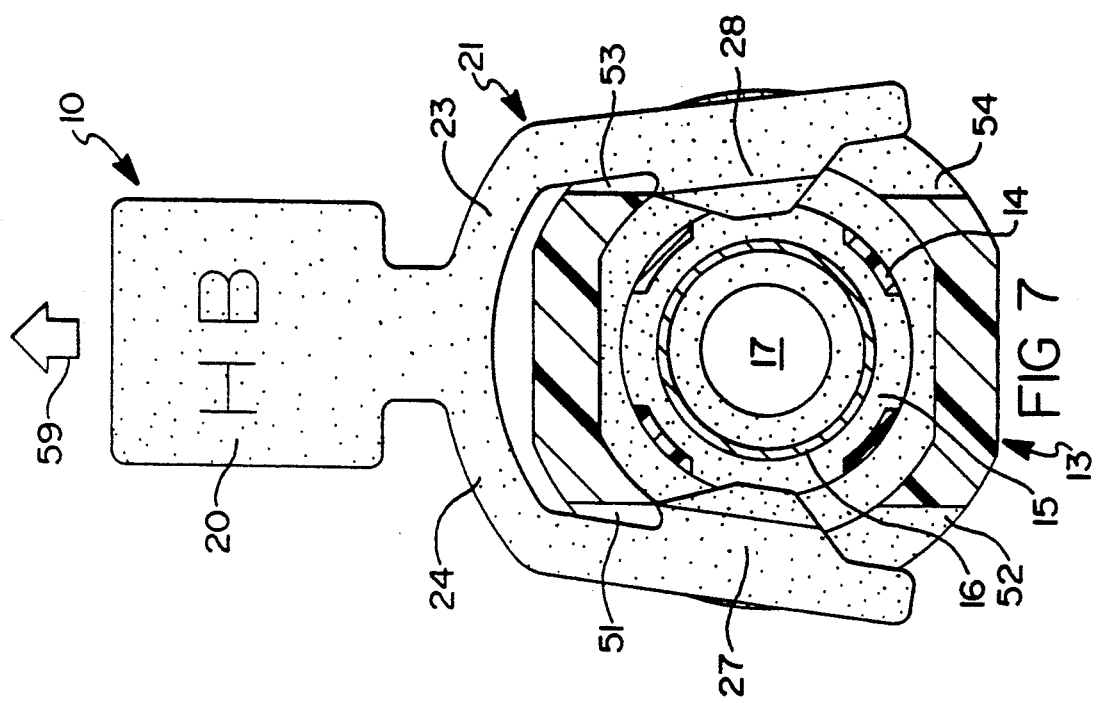
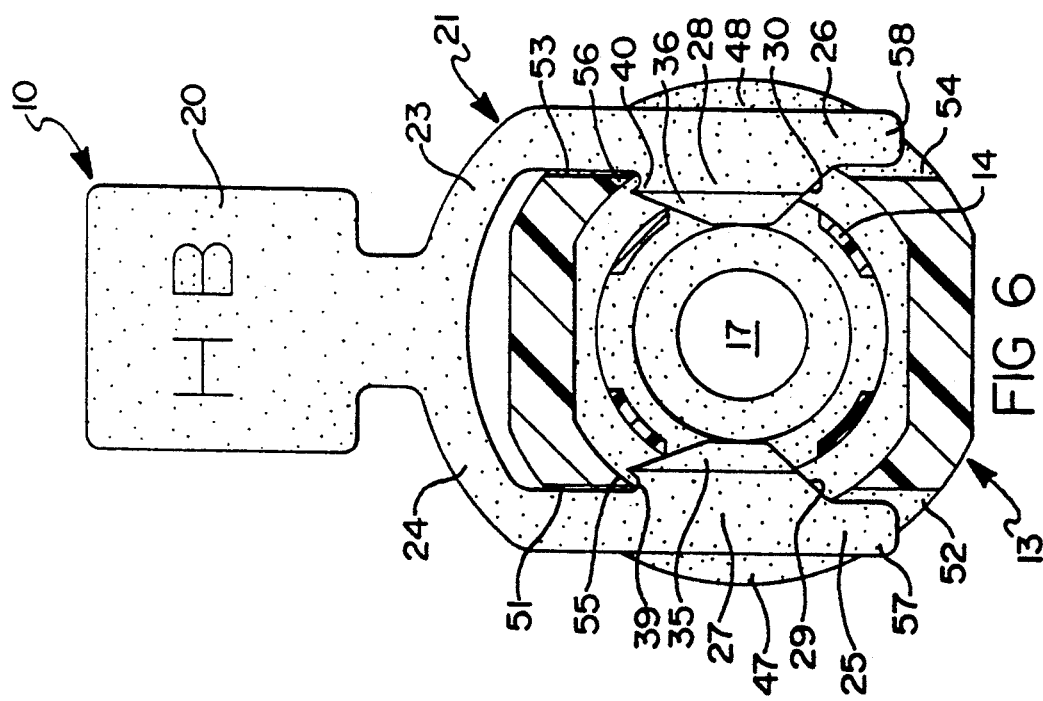

QUICK CONNECT INSERTION INDICATOR CLIP

INTRODUCTION

The present invention relates to quick connectors, and, more particularly, to quick connectors having a means enabling, by external inspection, determination of proper coupling between the male and female portions of the connector.

BACKGROUND OF THE INVENTION

It is desirable in fluid-handling conduits to ensure that the connectors used have their male and female portions properly coupled together. A faulty connector enables an associated host system to leak fluid. This can be particularly disadvantages when the system is under pressure and the leaking connector expels the pressurized fluid.

In the quick connector field, where the male and female portions of the connectors are held together by friction blocking connections, it is important that the male and female portions are properly coupled. To ensure the proper coupling, the installer may tug on or manipulate the connector to make sure that it is properly coupled. Also, visual types of inspecting devices enable the installer to ensure that the male and female portions are properly coupled together.

U.S. Pat. No. 4,925,217 to Ketcham discloses a quick connector with a visual checking feature wherein a deformable member is assembled within the fitting which includes elongated members extending out of the housing between the male and female portions prior to coupling and which are retracted, and no longer visible, once the coupling has been accomplished. Although this type of connector may work satisfactorily for its intended purpose, designers are always trying to improve the field. Furthermore, the annual member, employed by Ketcham to verify coupling remains in-assembly with the coupling and contributes to component count, tolerance stack-up, and possible misassembly. Furthermore, the elongated members which are visible during non-coupling of the device are, by design, not visible after coupling is effected. In many applications, such as an extremely crowded engine compartment of a passenger automobile, the installed coupling may be difficult to see and inspect closely. Thus, the inability to see the elongated member from a distance or from an awkward position will not result in a high degree of confidence that coupling has in fact, taken place. Restated, devices such as disclosed in Ketcham operate on a negative premise that the absence of visual contact with the elongated members correlates with a completed coupling. Lastly, because the annular member is retained in assembly, it can interfere with the use of release tools that are subsequently brought to bare for disassembly or inspection of the host system.

U.S. Pat. No. 4,946,205 to Washizu discloses a connector for connecting small diameter pipe including a confirmation member which is removable upon proper installation of the connector parts. Although representing an advance in the art, devices such as that disclosed by Washizu introduce additional shortcomings, especially cost, due to complexity. The Washizu confirmation member has asymmetrical, complex shape requiring extreme precision for proper operation and close alignment for assembly and removal. Furthermore, being non-symmetrical, it is not usable in a bi-directional or omni directional manner. Additionally, it tends to protrude from the coupling at its point of engagement making it vulnerable to unexpected or premature release. Lastly, its complexity requires a substantial amount of "real estate" in the axial direction as well as substantial modification to the coupling design itself.

BRIEF DESCRIPTION OF THE INVENTION

Accordingly, it is an object of the present invention to provide a visual/tactile inspection device which enables, at a glance/touch, the installer to ensure proper coupling of the connector. Also, the present invention provides the art with a simple, inexpensive inspection device that overcomes the shortcoming of the prior art described hereinabove. In the broadest sense, an indicator device for quick connectors includes a flag which is adapted for positioning externally of a quick connector element and engagement means which is releasably interlocked with that element and is removable therefrom upon full engagement of a second quick connector element with the first quick connector element. This arrangement has the advantage of requiring verification that the coupling has been completed by being highly visible/accessible at all times prior to removal and being removable only after coupling has been effected. This is particularly advantageous in complex systems where numerous couplings are employed wherein, with a relatively casually glance, an installer or technician can readily identify suspect couplings by the fact that they still have a visible flag and focuses his intention thereto. According to the preferred embodiment of the invention, the flag portion and the engagement means are integrally formed from substantially planar sheet stock such as plastic or other suitable material which is inherently relatively resilient. This provides the advantage of an indicator device which supports itself upon an outer surface of the female portion of a connector, serving to hold the flag upright and ensure its visibility. Furthermore, this construction results in an extremely inexpensive design.

Accordingly to another aspect of the invention, the engagement means includes a number of members which resiliently embrace the female element and one of more of those members include an engagement tab which extends radially inwardly through an opening in the female element and is axially positioned for abutment with a radially outwardly extending abutment surface defined by the mating male connector element. This arrangement provides the advantage of an indicator device design which can be employed with any number of existing quick connectors without requiring significant modification thereof.

According to yet another aspect of the invention, the indicator clip is symmetrically formed from relatively thin, planar sheet material and the engagement means includes a system of tapered, ramped leading and trailing tangential and longitudinal surfaces. This arrangement facilitates (dis)engagement of the indicator device and female coupling element wherein a degree of misalignment between the indicator device and tangential extending slots in the female element is permissible during the insertion process. This arrangement is relatively non-invasive, permitting use of existing, conventional quick connector designs and facilitates miniaturization inasmuch as it requires or a very small amount of space in the axial direction.

According to still another aspect of the invention, the female element defines opposed radial openings which are axially coincident with radially extending abutments surfaces defined by the male element. The opening includes axially spaced surfaces defining a number tangentially extending slots which are dimensioned for slip fit receipt of the indicator members to lend longitudinal and rotational stability thereto. This arrangement has the advantage of further ensuring upstanding deployment of the indicator device for enhanced visibility and also permits bi-directional or multidirectional access of the device to the coupling.

These and other features and advantages of this invention will become apparent upon reading the following specification, which, along with the drawings, describes and discloses a preferred embodiment of the invention in detail.

The detailed description of the disclosed embodiment makes reference to the accompanying drawings.

BRIEF DESCRIPTION OF THE DRAWINGS

FIG. 1, is a perspective exploded view of a conduit quick connector assembly embodying the present invention;

FIG. 2, is a front plan view on an enlarged scale of the indicator device of FIG. 1;

FIG. 3, is a cross-section view taken on lines III—III of FIG. 2;

FIG. 6, is a cross-sectional view taken on lines VI—VI of FIG. 4, in assembly with the indicator device of FIG. 2;

FIG. 7, is the same as FIG. 6 but with the male portion of the coupling fully inserted;

FIG. 8, is an alternative embodiment of the indicator clip of the present invention; and FIG. 9, is a cross-section view taken on lines IX—IX of FIG. 8.

DETAILED DESCRIPTION OF THE PREFERRED AND ALTERNATIVE EMBODIMENTS

Figure 4:
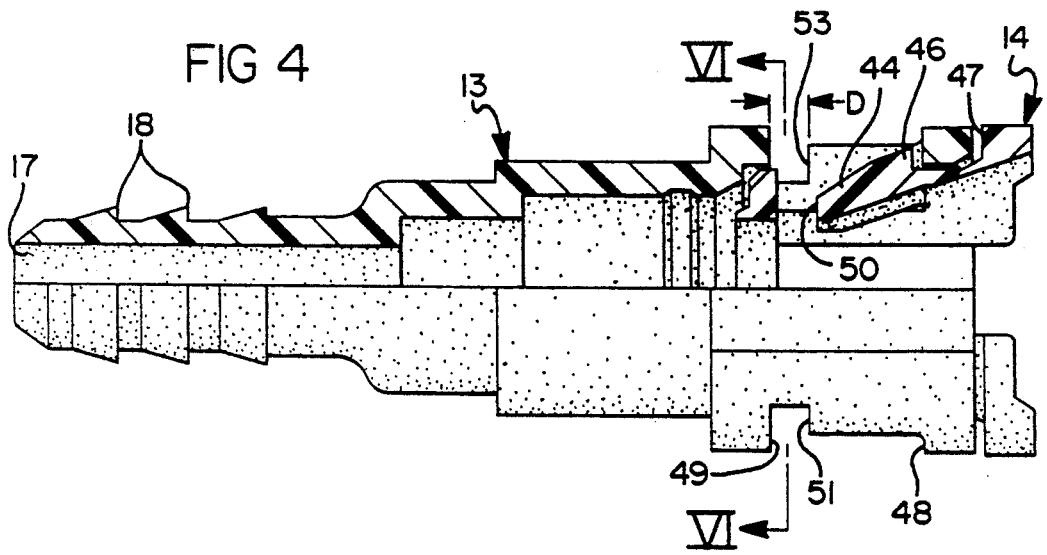
FIG. 4, is a quarter cross-section front plan view on an enlarged scale of the female portion and the retainer of FIG. 1 shown in assembly.

Referring to FIG. 1, the present invention includes an indicator device or clip 10 for use with a quick connector shown generally at 11, including male and female elements 12 and 13, respectively, and a locking member or retainer 14. With the exception of modifications described hereinbelow, quick connector 11 is representative of known commercially available devices. The quick connector 11 illustrated herein is adapted for application within systems employing tubular conduit, although it is contemplated that the present invention could be employed with other structural configurations.

Male element 12 is illustrated as a thin wall metallic tube with an upset or external circumferential flange 15 integrally formed therein adjacent an end 16 adapted for insertion within a stepped through-passage 17 in female element 13. The end of female element 13 distal male element 12 has a series of external circumferential barbs 18 adapted for locking engagement with a resilient conduit (not illustrated). Locking member 14 is carried within an enlarged end 19 of female element 13 proximal male element 12 as will be described in greater detail hereinbelow.

Referring to FIGS. 2 and 3, the structural details of indicator device 10 are shown on an enlarged scale. Indicator device 10 is formed from a planar piece of plastic or other suitable material and includes a generally rectangular flag portion 20 and a quick connector engagement portion 21 which depends from flag portion 20 through an intermediate neck region 22. Engagement portion 21 is bifurcated into two complementary elongated members 23 and 24. Members 23 and 24 terminate in spaced generally parallel end portions 25 and 26, respectively. Engagement tabs 27 and 28 extend inwardly from end portions 25 and 26, respectively, for engagement with female element 13 as will be described in further detail hereinbelow. Tabs 27 and 28 each include a leading edge ramp surface 29 and 30, a trailing edge ramp surface 31 and 32, a (radially) inner surface 33 and 34, an axial leading surface 35 and 36, and an axial trailing surface 37 and 38, respectively. Surface 38 is not illustrated in the drawings but is identical in shape to surface 37. The radially outer most (upward most as viewed in FIG. 2) portion of trailing edge ramp surfaces 31 and 32 form a retention hook 39 and 40, respectively at their point of transition into end portions 25 and 26, respectively.

Flag portion 20 forms front and rear surface areas 41 and 42, respectively, suitable for maximizing the visibility of an indicator device within a subsystem of a host automotive vehicle. Coding or instructional indicia 43 is imprinted on surface areas 41 and 42 as an instructional cue for the servicing technician. Additionally, device 10 can be coded or molded in brilliant, attention attracting colors to aid in the location process.

Figure 5:
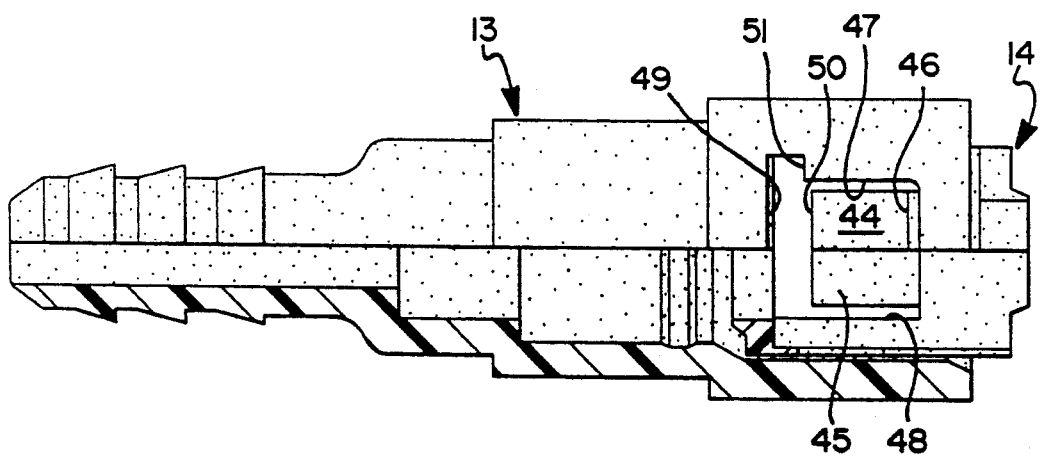
FIG. 5, is a quarter cross-section view of the assembly of FIG. 4 taken from the top.

Referring to FIGS. 4 and 5, a subassembly of female element 13 and locking member 14 are illustrated on an expanded scale. The male element receiving end (right-hand most) of the female element 13 of FIGS. 4 and 5, is enlarged to receive locking member 14. Locking member 14 defines two inwardly directed male element engaging fingers 44 and 45 which include an axially inwardly directed abutment surface 46 formed therein which lockingly engages within one of a pair of opposed radial openings 47 and 48 formed in female element 13. The left-ward most lateral surface of element 13 defining openings 47 and 48 is designated as surface 49 which is axially spaced from the left-ward most surface 50 of fingers 44 and 45 by dimension D which is slightly greater than the thickness of indicator device 10, permitting an slip fit therebetween as will be illustrated in greater detail hereinbelow.

Both female element 13 and locking member 14 are made of injection molded plastic or other suitable material. Quarter cross-sections are employed in FIGS. 4 and 5 for simplicity inasmuch as the structure is substantially symmetrical about the center line axis of female element 13. Lastly, certain interior components that typically would be employed with female element 13, such as sealing o-rings and spacers which normally would be disposed within through passage 17, are deleted here for the sake of brevity.

Aligned pairs of tangential slots 51 through 54 formed in the outer surface of female element 13 open into radial openings 47 and 48 adjacent surface 49 and extend rightwardly towards the ends 50 of fingers 44 and 45, a distance substantially corresponding with dimension D.

Referring to FIG. 6, acutely angled undercut edges 55 and 56 are formed within female element 13 at the point of intersection of slots 51 through 54 with radial openings 47 and 48, respectively.

As is best viewed in FIGS. 6 and 7, the foregoing structural features of indicator device 10 and quick connector 11 are such as to enable the following operation.

End portions 25 and 26 are spaced apart by a dimension slightly larger than the lateral spacing of slots 51 and 53, and 52 and 54, respectively. Prior to installation in an end use system, indicator device 10 is attached to female element 13 by inserting the free ends 57 and 58 of end portions 25 and 26, respectively, of indicator device 10 into slots 51 and 53. As insertion takes place (downward as viewed in FIG. 6) the leading edge ramp surfaces 29 and 30 of device 10 will contact the outer surface of female element 13, causing end portions 25 and 26 to resiliently deflect radially outwardly momentarily unit engagement tabs 27 and 28 are fully aligned with radial openings 47 and 48. At that time, engagement portion 21 will spring back to its illustrated position wherein retention hooks 39 and 40 are disposed radially inwardly of edges 55 and 56, ensuring a positive interlocking between indicator device 10 and female element 13. End portions 25 and 26 are dimensioned whereby upon assembly, substantially the entire extent of the end portions 25 and 26 are contained within openings 47 and 48 and slots 51 through 54, thereby minimizing the chance of inadvertent release of indicator device 10 from an external source.

Thus assembled, female element 13 is installed in an intended end application. As an act of final assembly, male element 12 and female element 13 are axially joined together in which end 16 of male element 12 is inserted within through passage 17 of female element 13 until complete coupling therebetween is effected. Prior to complete coupling, engagement tabs 27 and 28 will remain axially spaced from circumferential flange 15 of male element 12. Coupling is complete when flange 15 regulates with or is in substantial alignment with slots 51 through 54 where upon fingers 44 and 45 will resiliently snap radially inwardly to capture flange 15 against abutting end surfaces 50. As elements 12 and 13 are coupled together, the leading edge of flange 15 wraps against the axial leading surfaces 35 and 36 of engagement tabs 27 and 28, again radially outwardly displacing end portions 25 and 26. This outward displacement continues until complete coupling is effected wherein the radially outward most surface of flange 15 is in abutting relationship with inner surfaces 33 and 34 of engagement tabs 27 and 28. At this position, coupling is complete and retention hooks 39 and 40 have been displaced radially outwardly beyond mating edges 55 and 56.

An assembly technician can verify complete coupling simply by grasping flag portion 20 of indicator device 10 and removing it radially in the direction indicated by arrow 59. If the male and female element 12 and 13 are in any way longitudinally misaligned, removal of indicator device 10 will not be possible, thus alerting the assembly technician to a potential problem.

Upon removal, trailing edge ramp surfaces 31 and 32 will cam against edges 55 and 56, further radially outwardly expanding end portions 25 and 26 until indicator device 10 is clear of female element 13.

By configuring indicator device 10 symmetrically, misassembly is not possible inasmuch as device 10 can be reversed and employed as described. Furthermore, the symmetrical nature of slots 51 through 54, permits bi-directional (i.e. from the top or the bottom as illustrated in FIGS. 6 and 7) subassembly of indicator device 10 and female element 13.

Referring to FIGS. 8 and 9, and alternative embodiment of an indicator device 60 is illustrated. Indicator device 60 includes an engagement portion 61 depending from a flag portion 62. Engagement portion 61 is bifurcated into two spaced arcate members 63 and 64 which terminate at the free end thereof in engagement tabs 65 and 66, respectively. As in the case of indicator device 10 of FIGS. 2 and 3, device 60 is formed of plastic and is of generally planar configuration with the exception of several ribs 67 formed on the front and rear surfaces of flag portion 62. The number, size and spacing of ribs 67 can be varied to provide a tactile coding identifying the associated coupling for applications where, in the installed condition it is not visible to the service technician. Coding or instructional indicia 68 can also be provided on flag portion 62. Engagement tabs 65 and 66 include leading edge ramp surfaces 69 and 70, trailing edge ramp surfaces 71 and 72, radial inner surfaces 73 and 74, axial leading surfaces 75 and 76 and axial trailing surfaces 77 and 78 (only surface 77 is illustrated in the drawings figure), respectively. Indicator device 60 operates exactly as described hereinabove with relation to indicator device 10 with the exception that it has the additional feature of tactile ribs 67 and extended engagement tabs 65 and 66 which permit use with conventional female elements 13 which are not provided with slots 51 through 54. While slots 51 through 54 serve to ensure that indicator device 10 is maintained in an upright position substantially normal to the axis of female element 13, it is contemplated that device 60 would have a limited degree of pivotal freedom about engagement tabs 65 and 66 which, in some applications, maybe desirable.

It is to be understood that the invention has been described with reference to a specific embodiment and variations to provide the features and advantages previously described in that embodiment is susceptible of modification as will be apparent to those skilled in the art. Accordingly, the foregoing is not to be construed in a limiting sense.

What is claimed is:

1. In combination:
   a quick connector assembly including mating male and female elements and locking means operative to positively interconnect said elements in a fixed relative longitudinal orientation, said female element defining opposed radial openings forming tangentially extending slots axially coincident with axially extending abutment surfaces defined on said male element; and
   an indicator device including a solid planar flag portion positioned externally adjacent said female element and spaced elongate members extending therefrom, said members resiliently embracing said female element and including opposed radially inwardly directed engagement tabs extending through said openings for contact with said abutment surfaces whereby upon positive interconnection of said male and female elements, said abutment surfaces contact and urge said tabs and members radially outwardly thereby releasing said indicator device from said female element, said indicator device further including sensory perceptible identification indicia on said flag portion, wherein said engagement tabs form a system of radially inwardly converging leading and trailing tangential and longitudinal surfaces engaging said slots to effect an enlarged alignment window between said indicator device and slots.

2. The combination of claim 1, wherein said spaced elongate members and engagement tabs are disposed substantially entirely within said openings and slots.

3. The indicator device of claim 1, wherein said openings include axially spaced surfaces defining said slots dimensioned for slip fit receipt of said members to lend longitudinal and rotational stability to said device.

4. The indicator device of claim 3, wherein said openings include a plurality of slots effecting bi-directional access of said device to said female element.

5. An indicator device for use with quick connectors of the type including mating male and female elements and locking means operative to positively interconnect said elements in a fixed relative longitudinal orientation, said female element defining opposed radial openings forming tangentially extending slots axially coincident with axially extending abutment surfaces defined on said male element, said device comprising:

a solid planar flag portion adapted for positioning externally adjacent said female element and spaced elongate members extending therefrom, said members adapted for resiliently embracing said female element and including opposed radially inwardly directed engagement tabs adapted for extending through said openings for contact with said abutment surfaces whereby upon positive interconnection of said male and female elements, said abutment surfaces contact and urge said tabs and members radially outwardly thereby releasing said indicator device from said female element, said indicator device further including sensory perceptible identification indicia on said flag portion, wherein said engagement tabs form a system of radially inwardly converging leading and trailing tangential and longitudinal surfaces adapted for engaging said slots to effect an enlarged alignment window between said indicator device and slots.

6. The indicator device of claim 5, wherein said flag portion, elongate members and engagement tabs are integrally formed.

7. The indicator device of claim 6, wherein said indicator device is formed of homogeneous, substantially planar material.

8. The indicator device of claim 7, wherein said material is plastic.

9. The indicator device of claim 5, wherein said elongate members and engagement tabs are formed of resilient material.

10. The indicator device of claim 5, wherein said flag portion comprises visually sensible indicia.

11. The indicator device of claim 5, wherein said flag portion comprises tactily sensible indicia.

* * * * *